(12) United States Patent
Konieczny et al.

(10) Patent No.: US 8,288,688 B2
(45) Date of Patent: Oct. 16, 2012

(54) ELECTRICALLY HEATABLE HONEYCOMB BODY WITH ZONES OF INCREASES RESISTANCE AND MOTOR VEHICLE WITH AT LEAST ONE HONEYCOMB BODY

(75) Inventors: Jörg-Roman Konieczny, Much (DE); Rolf Brück, Bergisch Gladbach (DE); Jan Hodgson, Troisdorf (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 375 days.

(21) Appl. No.: 12/627,119

(22) Filed: Nov. 30, 2009

(65) Prior Publication Data
US 2010/0108657 A1 May 6, 2010

Related U.S. Application Data

(63) Continuation of application No. PCT/EP2008/056180, filed on May 20, 2008.

(30) Foreign Application Priority Data

May 31, 2007 (DE) .......................... 10 2007 025 418

(51) Int. Cl.
*B60L 1/02* (2006.01)
*F01N 3/10* (2006.01)
*B01D 50/00* (2006.01)

(52) U.S. Cl. ........................... 219/202; 60/299; 422/177

(58) Field of Classification Search .................. 219/202, 219/205, 546–548; 60/299–302; 422/168, 422/174, 177, 180; 428/593; 502/20–22, 502/527.11, 527.19
See application file for complete search history.

(56) References Cited

U.S. PATENT DOCUMENTS

| | | | |
|---|---|---|---|
| 5,317,869 A | * | 6/1994 | Takeuchi ........................ 60/300 |
| 5,370,943 A | | 12/1994 | Brück et al. |
| 5,382,774 A | | 1/1995 | Brück et al. |

(Continued)

FOREIGN PATENT DOCUMENTS

DE 4303601 A1 8/1994

(Continued)

OTHER PUBLICATIONS

International Search Report dated Aug. 21, 2008.

*Primary Examiner* — Sang Paik
(74) *Attorney, Agent, or Firm* — Laurence A. Greenberg; Werner H. Stemer; Ralph E. Locher

(57) ABSTRACT

An electrically heatable honeycomb body is formed with at least one wound stack of sheet-metal foils. A first end of the stack is connected to an electrical terminal and a second end is connected to an electrical ground. The stack has a plurality of sheet-metal foils which are in electrical contact with one another and which are at least partially structured and determine, in the direction of the structures, a height of the stack. The stack has at least one curvature with a small radius of curvature and a relatively large radius of curvature. A curvature section including the at least one curvature has at least one zone with increased electrical resistance starting from the small radius of curvature and extending over part of the height of the stack. A motor vehicle having at least one honeycomb body, is also provided.

13 Claims, 4 Drawing Sheets

U.S. PATENT DOCUMENTS

| | | |
|---|---|---|
| 5,411,711 A | 5/1995 | Swars |
| 5,422,082 A | 6/1995 | Yoshizaki et al. |
| 5,525,309 A | 6/1996 | Breuer et al. |
| 5,529,759 A * | 6/1996 | Sanada et al. .................. 422/174 |
| 5,554,342 A | 9/1996 | Hirayama et al. |
| 5,643,484 A | 7/1997 | Swars et al. |
| 5,948,504 A * | 9/1999 | Swars et al. .................. 428/116 |
| 6,136,450 A * | 10/2000 | Maus ............................ 428/593 |
| 6,365,283 B1 * | 4/2002 | Bruck ........................... 428/593 |

FOREIGN PATENT DOCUMENTS

| | | |
|---|---|---|
| EP | 0567034 A1 | 10/1993 |
| WO | 9202714 A1 | 2/1992 |
| WO | 9213635 A1 | 8/1992 |
| WO | 9213636 A1 | 8/1992 |

* cited by examiner

US 8,288,688 B2

ELECTRICALLY HEATABLE HONEYCOMB BODY WITH ZONES OF INCREASES RESISTANCE AND MOTOR VEHICLE WITH AT LEAST ONE HONEYCOMB BODY

CROSS-REFERENCE TO RELATED APPLICATION

This is a continuation, under 35 U.S.C. §120, of copending International Application No. PCT/EP2008/056180, filed May 20, 2008, which designated the United States; this application also claims the priority, under 35 U.S.C. §119, of German Patent Application DE 10 2007 025 418.2, filed May 31, 2007; the prior applications are herewith incorporated by reference in their entirety.

BACKGROUND OF THE INVENTION

Field of the Invention

The present invention relates to a honeycomb body which is formed from a wound stack of partially structured sheet-metal foils, wherein the stack has an electrical terminal so that a path is provided for conducting an electric current through the honeycomb body in order to heat it. The invention also relates to a motor vehicle with at least one honeycomb body.

The development of metallic honeycomb bodies which can be heated electrically has been pursued decisively by the corporate applicant of the instant application over the last 20 years. In this regard, reference can be made, for example, to International Publication No. WO 92/02714 A1, corresponding to U.S. Pat. No. 5,411,711. That document describes a honeycomb body which is constructed from metal sheets that are disposed in layers, are at least partially structured and form a plurality of passages through which an exhaust gas can flow and which run from one end face to the other. In addition, a plurality of planar gaps and/or electrically insulating layers which run in the direction from one end face to the other are positioned in such a way that at least one coherent, electrically conductive current path which runs in a cross-sectional plane is produced. The metal sheets are electrically conductively connected at one of their ends to a first connecting contact and at the other of their ends to a second connecting contact. That makes it possible, in particular, to implement measures for feeding in and carrying away power substantially in one plane.

A further honeycomb body is known from International Publication No. WO 92/13636 A1, corresponding to U.S. Pat. Nos. 5,370,943; 5,382,774; and 5,525,309. That honeycomb body can control the path of the electrical current through the honeycomb body through the use of a targeted local increase in electrical resistance, in such a way that zones which are heated to an increased degree by the electrical current can be formed in corresponding regions of the sheet-metal layers so that nonhomogenous heating of the honeycomb body is possible.

The longstanding practice of using honeycomb bodies as heating catalytic converters has revealed that in some cases the current does not propagate uniformly along the individual sheet-metal foils of a stack but instead in the case of wound or even coiled honeycomb bodies the current searches for the shortest path between the electrical terminal and the electrical ground. In that context, the current makes use, in particular, of the contact faces between structured and smooth metal sheets through which it can jump over from an outer metal sheet onto an inner metal sheet, in particular in curved regions, and can therefore search for the shortest current path. As a result, different distributions of the current density over the cross section of the honeycomb body and therefore also undesired nonhomogenous distribution of heat occur.

In particular, in the case of large honeycomb bodies which have recently been used to a greater extent, the nonhomogenous heating is increased with respect to the cross section of the honeycomb bodies due to large stack heights. Due to the size, the effect of thermal convection is also very much smaller in that case than in honeycomb bodies which are smaller in size so that regions of the honeycomb body to which less electric current is applied also remain cool for a significantly longer time.

SUMMARY OF THE INVENTION

It is accordingly an object of the invention to provide an electrically heatable honeycomb body with zones of increased resistance and a motor vehicle with at least one honeycomb body, which overcome the hereinafore-mentioned disadvantages and at least partially solve the problems of the heretofore-known devices of this general type and in particular make available a honeycomb body which permits homogenous heating over the entire cross section of the honeycomb body. At the same time, the intention is to specify a honeycomb body which, by virtue of homogenous power loading, has a longer service life despite relatively frequent use (for example in an exhaust system of a motor vehicle).

With the foregoing and other objects in view there is provided, in accordance with the invention, a honeycomb body, comprising at least one wound stack having a plurality of sheet-metal foils in electrical contact with one another. The at least one wound stack has a first end. The at least one wound stack has a second end connected to electrical ground. An electrical terminal is connected to the first end of the at least one stack. At least part of the sheet-metal foils has structures in a structure direction and the sheet-metal foils determine a height of the at least one stack in the structure direction. The at least one stack has a curvature section including at least one curvature with a relatively small radius of curvature and a relatively large radius of curvature. The at least one stack forms at least one zone with increased electrical resistance in the curvature section. The at least one zone starts from the relatively small radius of curvature and extends over part of the height of the at least one stack.

The above-mentioned stack of a plurality of sheet-metal foils which are in electrical contact with one another may, in particular, be connected to an electrical terminal which is disposed on a housing that surrounds the honeycomb body. This housing can also, if appropriate, have a plurality of segments over its circumference in order to therefore apply current to individual stacks. Furthermore, the ground can either be disposed on the circumference or else centrally in the middle of the cross section of the honeycomb body, and at the same time it should be connected to all of the layers. The two publications by the applicant which are mentioned above may, in particular, also be used to provide an illustration and a more detailed description of the measures for feeding in power.

The structures of the sheet-metal foils are preferably formed from corrugated forms or shapes which extend parallel to the longitudinal axis or the through-flow direction of the honeycomb body, in which case the corrugated forms or shapes are configured, in particular, in the form of omega waves or sine waves or in a zigzag fashion (pointed). It is basically possible for a stack to be formed by a plurality of sheet-metal foils which bear one against the other in a planar fashion so the structures form a plurality of flow paths along their surface, for example for an exhaust gas. The structures therefore space apart the adjacent sheet-metal foils so that the sheet-metal foils which bear one against the other ultimately form a height of the entire stack which depends, in particular, on the sum of the structure heights and the thicknesses of the sheet-metal foils. Basically, it is possible for a plurality of stacks to form a honeycomb body, but in this case for the sake of a simple construction it is preferred to use a single stack (or at maximum 2 stacks) which fills the cross section of the honeycomb body with its, for example, meandering configuration.

The at least one zone with increased electrical resistance, which is to be constructed, in particular, in the inner region of a curvature in the inner sheet-metal foils of a stack, serves to prevent the current from searching for the shortest possible path on the inside of the curvature and therefore preferably conducting the current over the outer sheet-metal foils of the stack within the curved section in order to therefore ensure an adapted current density and therefore homogenous heating of the honeycomb body even in the region of the curvature. For this purpose, the procedure adopted is, in particular, such that, for example, the sheet-metal foils, their configuration and/or electrical contact with one another is changed in a predefined curved section compared to other regions of the stack. In this curved section, in other words specifically near to the "inner, relatively small" radius of curvature, a zone with an increased electrical resistance compared to a region of the "outer, relatively large" radius of curvature is formed so that the zone accordingly extends over only part of the height of the stack, for example at most 60% of the height or even only 30% of the height. It is preferred in this case that the proportion of the height over which the at least one zone extends is selected as a function of the configuration of the curvature (radius of curvature, curved section length, . . . ), that is to say for example it increases if there is a relatively pronounced curvature. The zone extends in this case over a plurality of sheet-metal foils so that the zone is formed only through the interaction of the electrical resistance and/or of the electrical contact of the individual sheet-metal foils.

In accordance with another feature of the invention, it is proposed that the at least one zone be formed with sheet-metal foils which have a minimum bending radius which is less than 80 mm. The zone is preferably only formed then or is only formed at the sheet-metal foils which, in the region of the curved section, have a minimum bending radius of less than 50 mm, and particularly preferably of less than 20 mm in the at least one zone. The bending radius serves as a description of the curvature profile (the center plane or central face) of an individual sheet-metal foil. If a structured sheet-metal foil is considered, the curvature profile of the center plane is considered. Within the curved section, the bending radius of a sheet-metal foil may vary, for which reason the minimum bending radius is used in this case and, if appropriate, the sheet-metal foil itself can be varied over the entire curved section if its minimum bending radius is less than the above limiting value at a location or only for precisely the area which has a bending radius of less than 80 mm, for example.

In accordance with a further feature of the invention, the at least one zone lies within an angle which starts from an origin of the radius of curvature. In other words, the honeycomb body therefore has, in particular, at least one zone with increased resistances, with the zone lying within an angle which starts from an origin of the (small) radius of curvature. The resistances in the individual sheet-metal foils should be embodied in such a way that the electrical current is not kept away completely from the at least one zone but rather, only to a relatively small degree, passes through the sheet-metal plates which, in particular, lie near to the smallest radius of curvature. For this reason, this angle bounds, for example, the length of each sheet-metal foil on which the sheet-metal foil has increased electrical resistances in order to divert an increased power flow from regions through which there is preferably a flow into the sheet-metal foils of a stack which are disposed from the smallest radius of curvature towards the outside. The angle in this case may be constant and have a range from 0 to 360°, preferably a range from 90 to 180°, and particularly preferably a range from 120 to 160°. The angle can also vary as a function of the respective bending radius of the sheet-metal foils or the (smallest) radius of curvature of the curved section and can correspondingly be specified as a function of the changing bending radius. In particular, a relatively large angle should be selected for sheet-metal foils with a relatively small bending radius.

In accordance with an added feature of the invention, at least some of the sheet-metal foils have zone sections of different lengths in the region of the at least one zone. This means, in particular, that the zone in the direction of the height of the stack does not need to have a constant profile, that is to say need not be embodied in this case, for example, as rectangular, semicircular or conical zones. Instead, it is possible (but is not compulsory) for each sheet-metal foil which forms the at least one zone to be modified over a predefinable region in terms of its through-flow behavior or contact behavior for electrical current, which region is, if appropriate, also different from (all of the) adjacent sheet-metal foils.

Basically, the resistances in the sheet-metal foils or the contact resistance of a plurality of sheet-metal foils with one another can be increased in a wide variety of ways within the at least one zone.

In accordance with an additional feature of the honeycomb body of the invention, at least some of the sheet-metal foils differ in terms of their thickness in the at least one zone. Basically, it can be assumed that a relatively thick sheet-metal foil has a smaller electrical or ohmic resistance than a relatively thin sheet-metal foil (given the same length and same material). The sheet-metal foils can, of course, be embodied with a respective thickness throughout, in which case the sheet-metal foils can then differ in having different resistances in other curved regions, or the sheet-metal foils are respectively composed of materials of different thickness.

In accordance with yet another feature of the invention, the sheet-metal foils are provided at least partially with a structure, and at least some of the sheet-metal foils differ in their structures in the at least one zone. This means, in particular, that, on one hand, the structured sheet-metal foils can differ in terms of the height of their structuring and in terms of their shape. For example, metal sheets which have sine-shaped or omega-shaped structures provide a comparatively large contact face with adjacent (preferably smooth) sheet-metal foils as compared to metal sheets which are structured in a zigzag shape (pointed). These different contact faces produce relatively large or relatively small (contact) resistances in terms of the conduction of current from one sheet-metal foil to the other.

In accordance with yet a further feature of the invention, at least some of the sheet-metal foils have at least one element from the group including holes, slots, flaps and flow diverters. The elements may be provided individually or cumulatively and can also be used with different prescribed dimensions. In particular, in order to form the desired zone, it is possible to provide slots in the sheet-metal foils with a relatively small bending radius of a stack, which slots are disposed, in particular, transversely with respect to the main through-flow direction of the electric current so that the electric current is forced to adopt relatively long paths and therefore a diversion through adjacent layers is preferred. While holes and/or slots extend only in the plane of the sheet-metal foil, flaps and/or flow diverters protrude from the plane of the sheet-metal foils and can therefore additionally be used to perform electrical contact between adjacent sheet-metal foils and/or to influence the flow behavior of a fluid (in particular exhaust gas) through the honeycomb body or its passages.

In accordance with yet an added preferred feature of the invention, the size of a contact face between individual adjacent sheet-metal foils is different within the at least one zone. In addition to the feature already specified, it is to be noted herein that the contact faces between the adjacent surfaces can, in particular, also be interrupted, for example through the use of flaps, flow diverters, holes or slots which are disposed in the extremities of the structured sheet-metal foils or else in the smooth foils in the region of the extremities of the structured foils.

In accordance with yet an additional advantageous feature of the invention, at least one sheet-metal foil at least partially has an insulating coating within the at least one zone. This coating can be applied to the otherwise electrically conductive sheet-metal foils, for example by flame spraying, diffusion or other methods, and is therefore suitable, in particular, for influencing the contact resistance with adjacent sheet-metal foils.

In accordance with again another advantageous feature of the invention, at least one sheet-metal foil includes at least partially electrically non-conductive material within the at least one zone. It is therefore possible in the case of sheet-metal foils which are disposed within a stack in the region of the largest radius of curvature to keep the current within the sheet-metal foil without the current being able to divert to sheet-metal foils which are located further inwards in the direction of the smallest radius of curvature.

In accordance with again a further advantageous feature of the invention, at least some of the sheet-metal foils can be manufactured from different materials within the at least one zone. It is possible to set a specific resistance of the sheet-metal foil in this zone through the matched selection of suitable materials. It is preferred for the sheet-metal foils to have steel as a basic material, which material has a considerable amount of chromium and/or aluminium and/or nickel. Accordingly, in the region of the zone, the composition of the sheet-metal foils can be made different from that of other regions of the sheet-metal foil, for example also by changing the surfaces.

In accordance with again an added feature of the invention, the height of the at least one stack of the honeycomb body according to the invention is preferably at least 10 mm. In other embodiments, the height can also reach a value of at least 20 mm or even at least 50 mm. With these large stack heights, the effect of "shortening of the current flow" occurs to a greater degree so that, in particular, in the case of thick stacks without the zone of increased electrical resistance which is proposed herein in the curved section, only small internal regions would be heated as a result of the heating due to ohmic resistance. As a result, a particularly good effect of the invention has been shown in this case with thick stacks.

With the objects of the invention in view, there is concomitantly provided a motor vehicle, comprising at least one honeycomb body according to the invention. The honeycomb body according to the invention is, in particular, provided in this case for use in a motor vehicle. It then serves, for example, as a heating element for the exhaust gas flowing through it, a (catalytically active) coating which is at least partially provided on it and/or a further exhaust gas treatment device which is disposed downstream.

Other features which are considered as characteristic for the invention are set forth in the appended claims, noting that the features which are disclosed individually in the dependent claims can be combined with one another in any desired technologically appropriate fashion and define further refinements of the invention.

Although the invention is illustrated and described herein as embodied in an electrically heatable honeycomb body with zones of increased resistance and a motor vehicle with at least one honeycomb body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
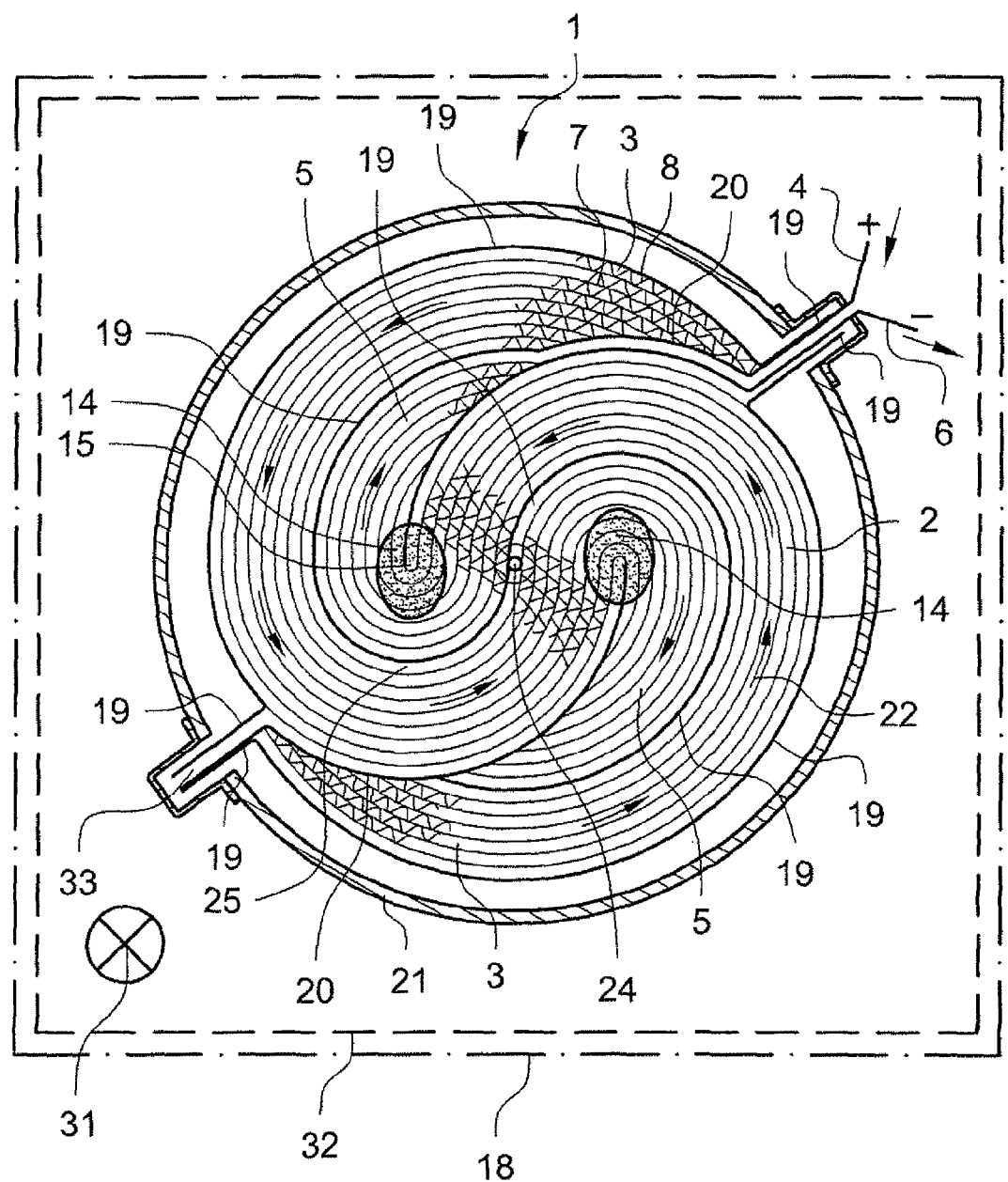
FIG. 1 is a diagrammatic, cross-sectional view of a honeycomb body with stacks, wound in an S-shape and partially insulated from one another, of alternately smooth and corrugated sheet-metal foils which define an S-shaped current path.

Referring now to the figures of the drawings in detail and first, particularly, to FIG. 1 thereof, there is seen a honeycomb body 1 according to the invention, as a component of an exhaust gas device 32 of a motor vehicle 18, in which a flow direction 31 of exhaust gas is parallel to a longitudinal axis 24 of the honeycomb body 1. The honeycomb body 1 is constructed in this case from two stacks 2 which are respectively composed of sheet-metal foils 7 that are smooth and sheet-metal foils 7 which have structures 8. The sheet-metal foils 7 are disposed alternately one on top of the other, with the two stacks 2 being wound with one other in an S-shape. The two wound stacks 2 are separated from one another by an insulation 19 and are located in the interior of a housing 21.

An electrical current 22 is input through an electrical terminal 4 and the current 22 is output through an electrical ground 6. At first, the current 22 flows through the electrical terminal 4 and current-distribution structures 20 which enclose a first end 3 of the first stack 2 in the manner or shape of a beak, into the first stack 2 and passes through an S-shaped path before being taken up by current-distribution structures 20 which also enclose a second end 5 of the first stack 2 in the manner or shape of a beak. From there, the current 22 is again fed through current-distribution structures 20, which also enclose the first end 3 of the second stack 2 in the manner or shape of a beak, into the second stack 2 before then flowing back, in the opposite direction to that of the first S-shaped path, through the second stack 2 at the second end 5 of which the current 22 is in turn taken up by current-distribution structures 20 which also enclose the second end 5 of the second stack 2 in the manner or shape of a beak. From there, the current 22 is diverted outwards through a through-connection to the electrical ground 6 (the flow of current is illustrated in principle with small arrows in FIG. 1).

Some of the current-distribution structures 20 extend into the interior of a receptacle 33 on the side of the housing 21 lying opposite the through-connection, and in this context the current feed line 4 and the electrical ground 6 are also separated from one another in the interior of this receptacle or cap by insulation 19, as in the through-connection. Areas in the interior of the honeycomb body 1 are also separated electrically from one another through the use of an insulation 19 (gap or insulation material).

In the embodiment of the honeycomb body 1 which is shown herein, the electric current 22 would preferably flow through the region of the smallest radii of curvature of the individual stacks 2, for example in the direct vicinity of an origin 15 of a radius of curvature 11 (see FIG. 2) so that in the region of the stack which has the greatest radii of curvature in this case, a sufficient current density would not be present, which would result in non-homogenous heating of the honeycomb body 1. For this reason, zones 14 in which an increased electrical resistance is present are provided, in particular, in the region of the smallest radii of curvature so that the electric current 22 is forced to flow to a greater extent through the outer sheet-metal foils 7 in the stack 2. The described zones 14 with different resistances can, in addition to the preferred configuration in the curved regions of the stacks 2, of course also be disposed in a very different embodiment along the longitudinal axis 24 of the honeycomb body 1 so that, in addition to the homogenous heating of an entire cross section 25 of the honeycomb body 1, homogenous and rapid heating is also achieved along the longitudinal axis 24 of the honeycomb body 1.

Figure 2:
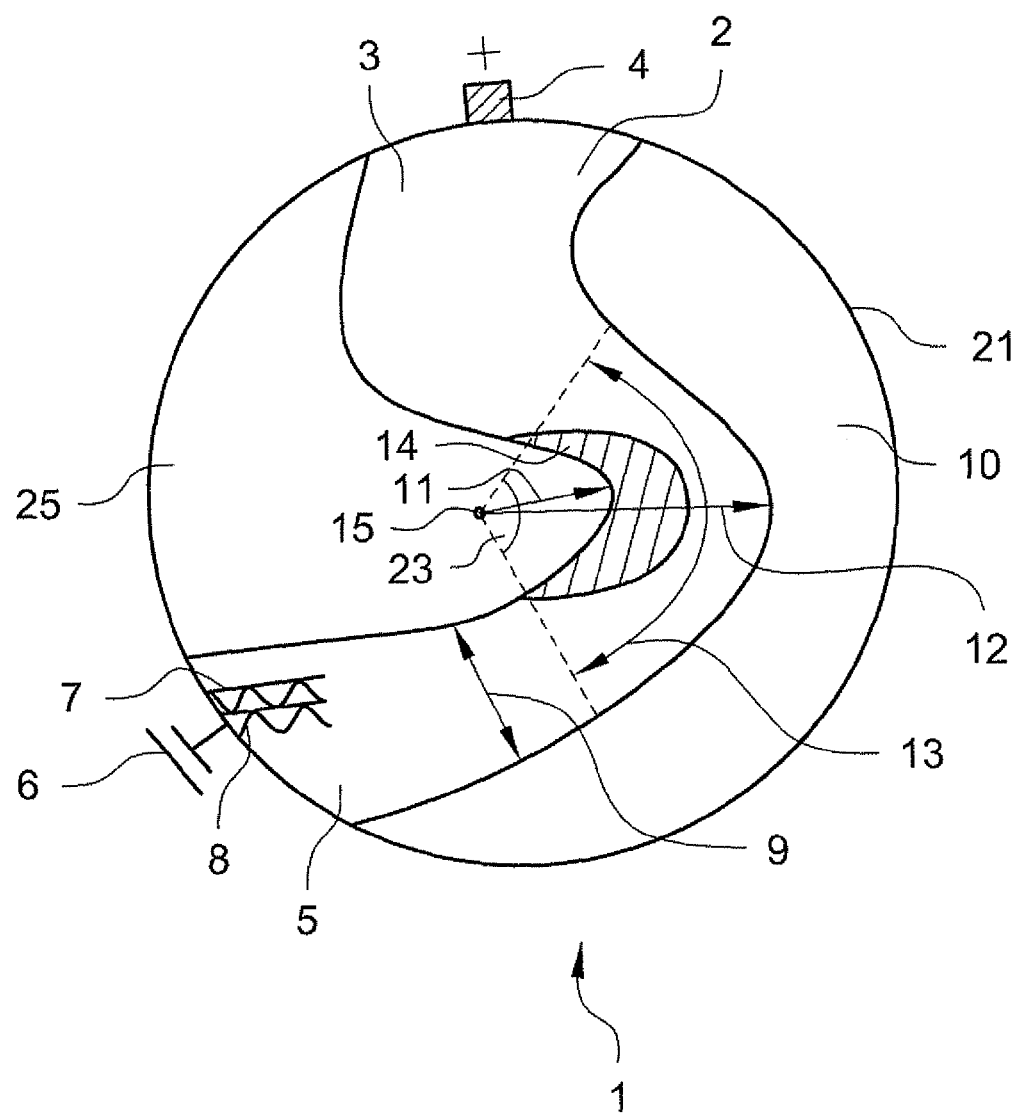
FIG. 2 is a cross-sectional view of a further honeycomb body with a stack which is wound in an S-shape.

FIG. 2 also is a diagrammatic view of a further exemplary embodiment of the honeycomb body 1 with a cross section 25, having just one stack 2 for better clarifying the function of the electrically heatable honeycomb body 1 which is illustrated. The stack 2 extends in this case from an electrical terminal 4, which is disposed on the housing 21 and has a first end 3, over a curved section 13, which includes a curvature 10, to the second end 5 of the stack 2, which is connected to the electrical ground 6 that is also tapped in this case in the housing 21. The stack 2 is constructed from smooth sheet-metal foils 7 and structured sheet-metal foils 7. The sheet-metal foils are disposed one on top of the other in the direction in which the structures 8 are formed, to define a height 9, wherein the stack 2, in the region of the curved section 13, has a small radius of curvature 11 starting from an origin 15 and a large radius of curvature 12. Within the curved section 13, a zone 14 is provided which is bounded on one hand by the small radius 11 of curvature, starting from the origin 15, and extends only over a certain proportion of the height 9 of the stack 2 and is also within an angle 23.

Within this zone 14, electrical resistances are formed together with the sheet-metal foils 7 in such a way that the current 22 does not flow, in particular, over the shortest conceivable path along the small radius 11 of curvature but rather is diverted through the zone 14 into the outer sheet-metal foil 7 in the vicinity of the large radius of curvature 12 in such a way that a matched current density is achieved and therefore homogenous heating of the entire stack cross section occurs.

Figure 3:
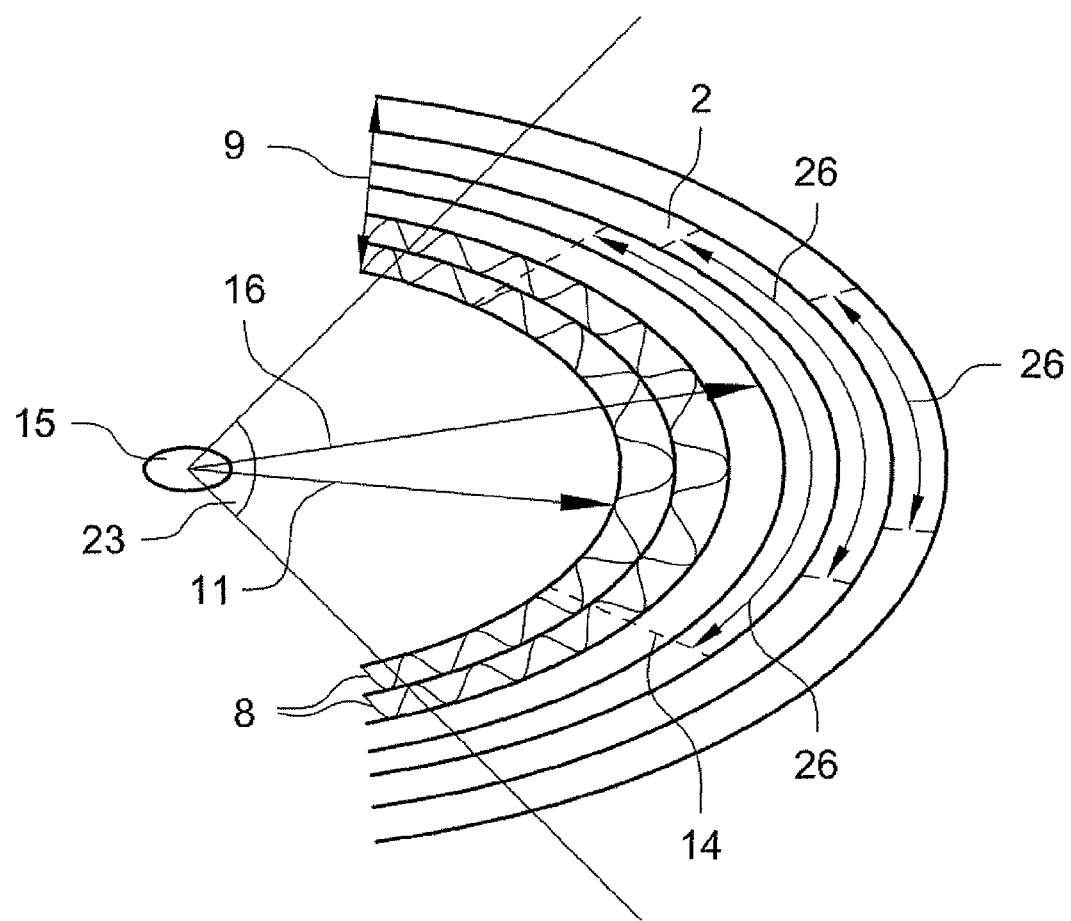
FIG. 3 is a fragmentary, cross-sectional view of a first embodiment variant of a stack.

FIG. 3 is a diagrammatic view of a section of a stack 2 with a height 9 and a zone 14 (bounded by dashed line). The zone is formed from individual zone sections 26 of the sheet-metal foils 7. In this context, the zone sections 26 are of different lengths in the respective sheet-metal foils 7. The zone sections 26 are disposed in this case within an angle 23 which extends from an origin 15 of a small radius of curvature 11 of the innermost sheet-metal foil 7 of a stack. The individual sheet-metal foils 7 can have different structures 8 so that preferred contact faces 29 (see FIG. 5) with corresponding contact resistances are formed in this way. The individual sheet-metal foils 7 of a stack 2 each have a bending radius 16 which can also change within the curved section 13 of the stack 2, along the sheet-metal foil 7.

Figure 4:
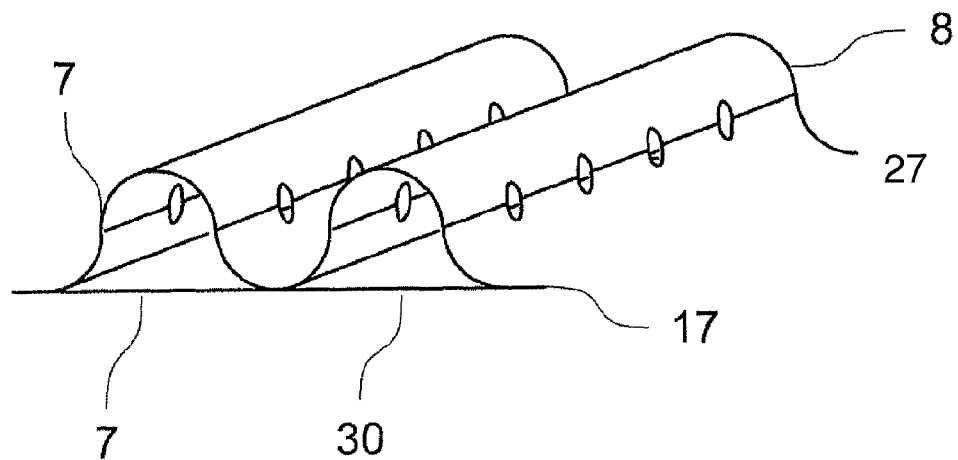
FIG. 4 is a fragmentary, perspective view of a second embodiment variant of a stack.

FIG. 4 is a diagrammatic view of a portion of a stack 2 in which the sheet-metal foils 7 have partially corrugated structures 8 and additionally have holes 27 which may also be embodied as elongate slots. Furthermore, the smooth sheet-metal foil 7 is provided in this example with an insulating coating 30 and has a thickness 17.

Figure 5:
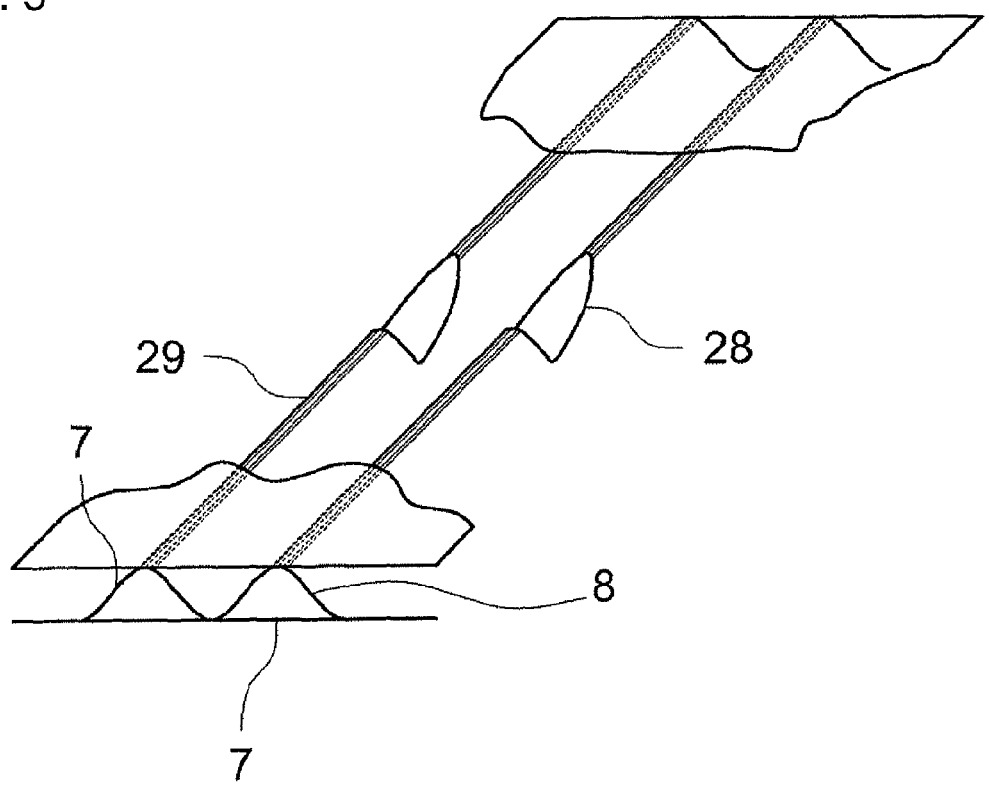
FIG. 5 is a fragmentary, perspective view of a third embodiment variant of a stack.

FIG. 5 is a diagrammatic view of a further portion of a stack 2 in which the sheet-metal foils 7 partially have structures 8 and flow diverters 28. The corrugated structures 8 are connected through the use of contact faces 29 in an electrically conductive fashion to the smooth sheet-metal foils 7. The contact resistance between the sheet-metal foils 7 is increased in this case in the region of the flow diverters 28 by omitting contact faces 29.

The different embodiments of honeycomb bodies which are shown herein show only a limited selection of embodiments in terms of the winding or the power supply or other details of the honeycomb body.

The invention claimed is:

1. A honeycomb body, comprising:
   at least one wound stack having a plurality of sheet-metal foils in electrical contact with one another in a configuration;
   said at least one wound stack having a first end;
   said at least one wound stack having a second end connected to electrical ground;
   an electrical terminal connected to said first end of said at least one stack;
   at least part of said sheet-metal foils having structures in a structure direction and said sheet-metal foils determining a height of said at least one stack in said structure direction;
   said at least one stack having a curvature section including at least one curvature with a relatively small radius of curvature and a relatively large radius of curvature and said at least one stack having other regions;
   said at least one stack forming at least one zone with increased electrical resistance in said curvature section, said at least one zone starting from said relatively small radius of curvature and extending over part of said height of said at least one stack; and
   at least one of said sheet metal foils, said configuration of said sheet metal foils or said electrical contact of said sheet metal foils with one another being changed in said curvature section as compared to said other regions to achieve an adapted current density in said curvature section over said height of said at least one stack and to achieve homogeneous heating in vicinity of said curvature section.

2. The honeycomb body according to claim 1, wherein said at least one zone is formed with sheet-metal foils having a minimum bending radius of less than 80 mm in said at least one zone.

3. The honeycomb body according to claim 1, wherein said relatively small radius of curvature has an origin, and said at least one zone lies within an angle starting from said origin.

4. The honeycomb body according to claim 1, wherein at least some of said sheet-metal foils have zone sections of different lengths in vicinity of said at least one zone.

5. The honeycomb body according to claim 1, wherein at least some of said sheet-metal foils have different thicknesses in said at least one zone.

6. The honeycomb body according to claim 1, wherein said structures of at least some of said sheet-metal foils differ in said at least one zone.

7. The honeycomb body according to claim 1, wherein at least some of said sheet-metal foils have at least one flow element selected from the group consisting of holes, slots, flaps and flow diverters.

8. The honeycomb body according to claim 1, wherein said sheet-metal foils have contact faces, and said contact faces between individual adjacent sheet-metal foils have sizes being different within said at least one zone.

9. The honeycomb body according to claim 1, wherein at least one of said sheet-metal foils at least partially has an insulating coating within said at least one zone.

10. The honeycomb body according to claim 1, wherein at least one of said sheet-metal foils includes at least partially electrically non-conductive material within said at least one zone.

11. The honeycomb body according to claim 1, wherein at least some of said sheet-metal foils are made of different materials within said at least one zone.

12. The honeycomb body according to claim 1, wherein said height of said at least one stack is at least 10 mm.

13. A motor vehicle, comprising at least one honeycomb body according to claim 1.

* * * * *